P. Hatch.
Filing Saws.
Nº 71302    Patented Nov. 26, 1867.
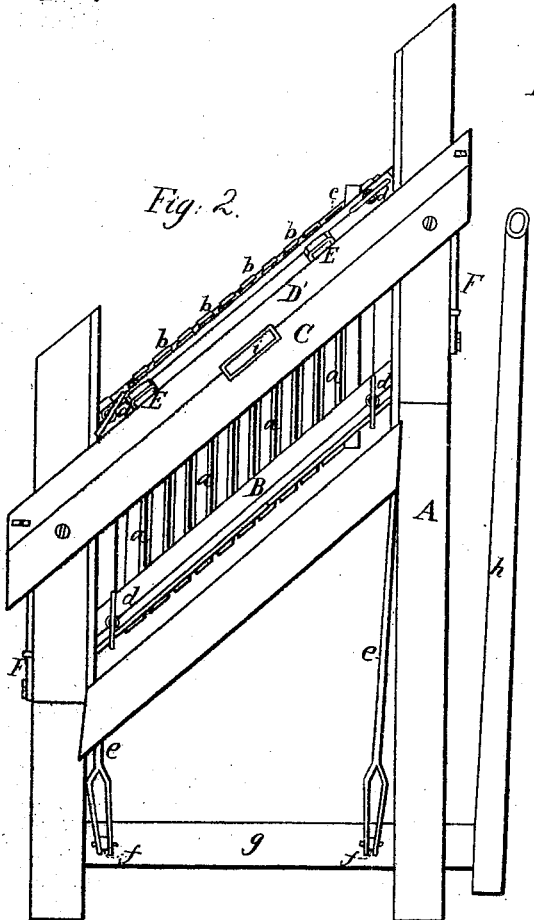
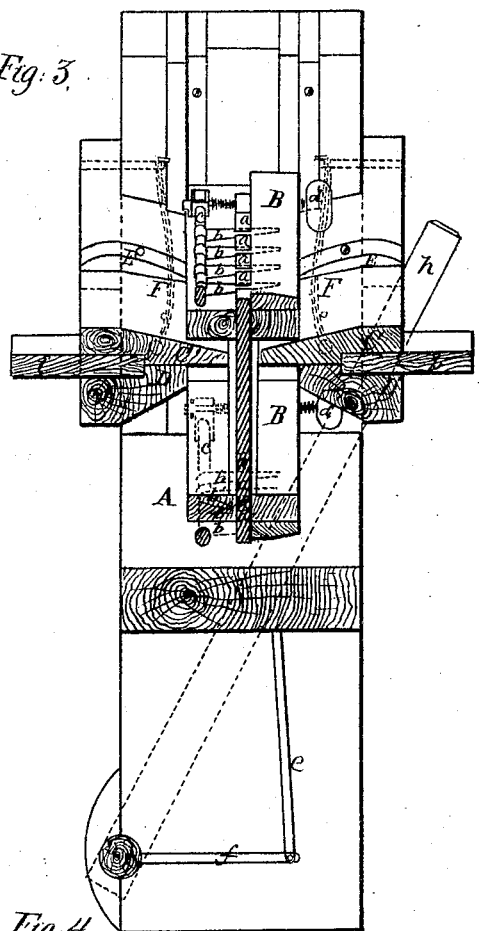
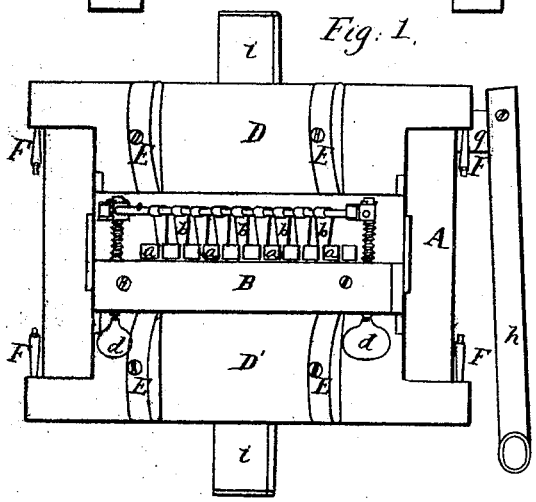
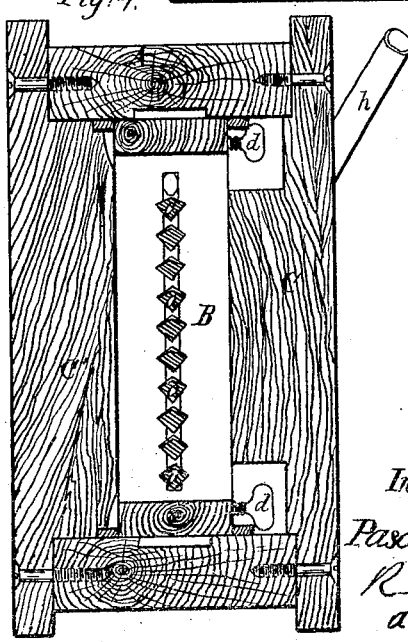
Witnesses:
Samuel N. Piper
Laurits Miller
Inventor:
Pascal Hatch.
R. Wedy
attorney.

United States Patent Office.

PASCAL HATCH, OF EAST CORINTH, VERMONT.

Letters Patent No. 71,302, dated November 26, 1867.

---

IMPROVEMENT IN SAW-FILING MACHINE.

---

The Schedule referred to in these Letters Patent and making part of the same.

---

TO ALL PERSONS TO WHOM THESE PRESENTS MAY COME:

Be it known that I, PASCAL HATCH, of East Corinth, in the county of Orange, and State of Vermont, have invented a new and useful Machine for Filing Saws; and do hereby declare the same to be fully described in the following specification, and represented in the accompanying drawings, of which—

Figure 1 is a top view.

Figure 2 a front elevation; and

Figure 3 a vertical and transverse section of the machine.

Figure 4 is a section taken in the plane of the inclination of the beds or platforms for supporting the saws.

In such drawings, A denotes a frame, within which, and so supported as to be capable of being moved vertically between suitable guides, is the file-frame B. This latter frame has arranged within it a series of files, $a\ a\ a\ a$, the transverse section of each horizontally being lozenge-shaped. These files should have teeth formed on their sides, like those of a common file, and they are fixed in the frame, at or near their upper ends, by a series of wedges, $b\ b\ b$, &c., arranged on a rod, $c$, provided with actuating-screws $d\ d$, by which it may be drawn toward the files. These wedges go between the files and into notches made in them, and thus serve to hold such files in place. The files, at their lower ends, are also similarly held by another set of wedges, as shown at $b'\ b'\ b'$, they being as represented in dotted lines in fig. 3. From the file-frame B two rods $e\ e$ extend downward, and are jointed to two arms $ff$, projecting from a horizontal shaft, $g$, arranged in the frame A, as represented in the drawings. By means of a lever, $h$, fixed to one end of the shaft, a person may turn the shaft, so as to impart to the file-frame with its files, a reciprocating vertical motion. In front of the series of files is an inclined platform or bed, C, which is fastened to the frame A. There is also another such platform or bed C', in rear of the files. Each platform serves to support a movable board or carriage, D or D', provided with clamps E E, for fastening a saw-blade down upon its upper surface. Each of the saw-carriages has springs F F, applied to it for forcing it toward the files, and it also has a handle or projection, $i$, by which it may be drawn backward, as occasion may require.

From the above it will be seen that the plane of each saw makes an acute angle with each of the files. This causes each file to cut into the saw at acute and obtuse angles with either face, and thereby to form the teeth with acute-angular cutting edges, whereby, when the saw is in use, it will be caused to operate to better advantage than it would were the edges of its teeth at right angles with their faces. By means of the said machine, all the teeth of a saw may be sharpened at once, or a blade may have its full set of teeth filed in it. Two blades or saws may be operated on at a time, each of the files being a duplex cutter or file, by reason of its lozenge shape in cross-section.

What I claim as my invention, in the above-described machine, is as follows:

I claim the combination as well as the arrangement of the series of files $a\ a\ a$, their frame B, and machinery for imparting to such frame vertical movements, as described, with the frame A, the platform C, or its equivalent, and the saw-carriage D.

I also claim the combination and arrangement of the single file-frame B, and its series of duplex files, or the equivalent thereof, with the frame A, and its two saw-carriages D D', applied to such frame A, substantially as described.

PASCAL HATCH.

Witnesses:
ABIGAIL FULTON,
ANN FULTON.